(12) United States Patent
Brooks et al.

(10) Patent No.: US 11,117,834 B2
(45) Date of Patent: Sep. 14, 2021

(54) CALCIUM SULPHASE-BASED PRODUCTS

(71) Applicant: SAINT-GOBAIN PLACO, Suresnes (FR)

(72) Inventors: Laura Brooks, Loughborough (GB); Robin Fisher, Loughborough (GB); Jan Rideout, Loughborough (GB)

(73) Assignee: SAINT-GOBAIN PLACO, Suresnes (FR)

( * ) Notice: Subject to any disclaimer, the term of this patent is extended or adjusted under 35 U.S.C. 154(b) by 504 days.

(21) Appl. No.: 15/524,956

(22) PCT Filed: Nov. 17, 2015

(86) PCT No.: PCT/EP2015/076786
§ 371 (c)(1),
(2) Date: May 5, 2017

(87) PCT Pub. No.: WO2016/079099
PCT Pub. Date: May 26, 2016

(65) Prior Publication Data
US 2017/0320779 A1    Nov. 9, 2017

(30) Foreign Application Priority Data
Nov. 21, 2014  (GB) ..................................... 1420768

(51) Int. Cl.
| C04B 28/14 | (2006.01) |
| C04B 22/06 | (2006.01) |
| C04B 22/14 | (2006.01) |
| C04B 103/56 | (2006.01) |
| C04B 111/00 | (2006.01) |
| C04B 111/28 | (2006.01) |

(52) U.S. Cl.
CPC .............. *C04B 28/14* (2013.01); *C04B 22/06* (2013.01); *C04B 22/142* (2013.01); *C04B 2103/58* (2013.01); *C04B 2111/00612* (2013.01); *C04B 2111/00939* (2013.01); *C04B 2111/28* (2013.01)

(58) Field of Classification Search
None
See application file for complete search history.

(56) References Cited

U.S. PATENT DOCUMENTS

| 2,526,066 A |  | 10/1950 | Croce |  |
| 2,744,022 A |  | 5/1956 | Croce et al. |  |
| 3,616,173 A |  | 10/1971 | Green et al. |  |
| 3,782,992 A |  | 1/1974 | Uchikawa et al. |  |
| 3,980,487 A |  | 9/1976 | Akabayashi et al. |  |
| 4,021,259 A | * | 5/1977 | Komatsu | C04B 22/08 524/4 |
| 4,664,707 A |  | 5/1987 | Wilson et al. |  |
| 4,722,866 A |  | 2/1988 | Wilson et al. |  |
| 5,346,550 A |  | 9/1994 | Kunzi et al. |  |
| 5,985,013 A |  | 11/1999 | Koller et al. |  |
| 6,013,125 A |  | 1/2000 | Quraishi et al. |  |
| 6,475,275 B1 |  | 11/2002 | Nebesnak et al. |  |
| 6,569,541 B1 |  | 5/2003 | Martin et al. |  |
| 7,101,430 B1 |  | 9/2006 | Pike et al. |  |
| 8,016,960 B2 | * | 9/2011 | Wittbold | B01F 13/103 106/772 |
| 10,584,063 B2 |  | 3/2020 | Brooks et al. |  |
| 10,662,113 B2 |  | 5/2020 | Brooks et al. |  |
| 2003/0138614 A1 |  | 7/2003 | Leclercq |  |
| 2004/0092614 A1 |  | 5/2004 | Hilton et al. |  |
| 2006/0107876 A1 | * | 5/2006 | Sandmeyer | C04B 28/14 106/772 |
| 2010/0071597 A1 |  | 3/2010 | Perez-Pena |  |
| 2010/0136259 A1 |  | 6/2010 | O'Keefe et al. |  |
| 2011/0195241 A1 |  | 8/2011 | Yu et al. |  |
| 2013/0199418 A1 |  | 8/2013 | Yamashita et al. |  |
| 2014/0121303 A1 |  | 5/2014 | Hagen et al. |  |
| 2014/0371352 A1 |  | 12/2014 | Dantin et al. |  |

FOREIGN PATENT DOCUMENTS

| CN | 1071156 A | 4/1993 |
| CN | 1443146 A | 9/2003 |
| CN | 101265067 A | 9/2008 |
| CN | 102173726 A | 9/2011 |
| CN | 102464478 A | 5/2012 |
| CN | 102826823 A | 12/2012 |
| CN | 102850031 A | 1/2013 |
| CN | 102464478 B | 2/2014 |
| CN | 103626439 A | 3/2014 |
| CN | 103803821 A | 5/2014 |
| CN | 103979837 A | 8/2014 |
| CN | 104016649 A | 9/2014 |

(Continued)

OTHER PUBLICATIONS

Lewis, Sr., Hawley's Condensed Chemical Dictionary, p. 42, 1993. (Year: 1993).*
May 23, 2017 International Preliminary Report on Patentability issued in International Patent Application No. PCT/EP2015/076786.
Feb. 1, 2019 Examination Report issued in European Patent Application No. 15 794 947.0.
Aug. 15, 2018 Examination Report issued in European Patent Application No. 15 794 947.0.
Yen, Chen, "6. Additives that reduce the tendency to shrink and crack," Gypsum building materials (second edition), China Building Materials Industry Press, 2012, pp. 283-285, ISBN 978-7-80227-549-2.
May 7, 2015 Search Report issued in British Patent Application No. 1420768.2.

(Continued)

*Primary Examiner* — David Sample
(74) *Attorney, Agent, or Firm* — Oliff PLC

(57) ABSTRACT

A calcium sulphate-based product including gypsum and a shrinkage resistance additive. The shrinkage resistance additive is a metal nitrate, hydroxide, acetate or sulphate and is preferably provided in an amount greater than 4 wt % (based on the amount of additive and gypsum). The additive may be a nitrate of an alkali metal (e.g. potassium), an alkaline earth metal (e.g. magnesium or calcium), a transition metal (e.g. iron or zinc) or aluminium.

8 Claims, 1 Drawing Sheet

(56) References Cited

FOREIGN PATENT DOCUMENTS

| | | | |
|---|---|---|---|
| CN | 104058644 A | | 9/2014 |
| EP | 0258064 A3 | | 10/1989 |
| EP | 1 081 113 A1 | | 3/2001 |
| EP | 2 502 891 A1 | | 9/2012 |
| JP | 72040693 B | * | 8/1968 |
| JP | 54083929 A | * | 7/1979 |
| JP | S55-126559 A | | 9/1980 |
| JP | S57-71841 A | | 5/1982 |
| JP | H042640 A | | 1/1992 |
| JP | H05-097487 A | | 4/1993 |
| JP | H07-133147 A | | 5/1995 |
| JP | H10-245256 A | | 9/1998 |
| JP | 2986986 B2 | | 12/1999 |
| JP | 2005-187278 A | | 7/2005 |
| JP | 2009-263217 A | | 11/2009 |
| KR | 100835702 B1 | | 6/2008 |
| RU | 2260572 C1 | | 9/2005 |
| RU | 2285677 C1 | | 10/2006 |
| RU | 2387607 C2 | | 4/2010 |
| RU | 2415093 C1 | | 3/2011 |
| SD | 1629269 A1 | | 2/1991 |
| WO | 99/08979 A1 | | 2/1999 |
| WO | 00/06518 A1 | | 2/2000 |
| WO | 2012/116313 A1 | | 8/2012 |
| WO | 2013048351 A1 | | 4/2013 |
| WO | 2013-098859 A1 | | 7/2013 |

OTHER PUBLICATIONS

Feb. 17, 2016 International Search Report issued with International Patent Application No. PCT/EP2015/076786.
Feb. 17, 2016 Written Opinion issued with International Patent Application No. PCT/EP2015/076786.
May 7, 2015 Search Report issued in Great Britain Patent Application No. GB1420766.6.
Feb. 10, 2016 Search Report issued in International Patent Application No. PCT/EP2015/076785.
Feb. 10, 2016 Written Opinion issued in International Patent Application No. PCT/EP2015/076785.
May 23, 2017 International Preliminary Report on Patentability issued in International Patent Application No. PCT/EP2015/076785.
May 5, 2019 Office Action issued in Chinese Patent Application No. 201580062495.3.
Feb. 10, 2016 Search Report issued in International Patent Application No. PCT/EP2015/076787.
Feb. 10, 2016 Written Opinion issued in International Patent Application No. PCT/EP2015/076787.
May 7, 2015 Search Report issued in British Patent Application No. 1420767.4.
Mar. 18, 2019 Office Action issued in Chinese Patent Application No. 201580062741.5.
Apr. 20, 2019 Search Report issued in Russian Patent Application No. 2017121655/03(037447).
Sep. 9, 2019 Office Action issued in Russian Patent Application No. 2017121655.
Sep. 12, 2019 English Translation of Office Action issued in Japanese Patent Application No. 2017-527560.
Mar. 1, 2021 Office Action issued in U.S. Appl. No. 16/750,623.
Jan. 25, 2021 Office Action issued in European Patent Application No. 20 159 919.8.

* cited by examiner

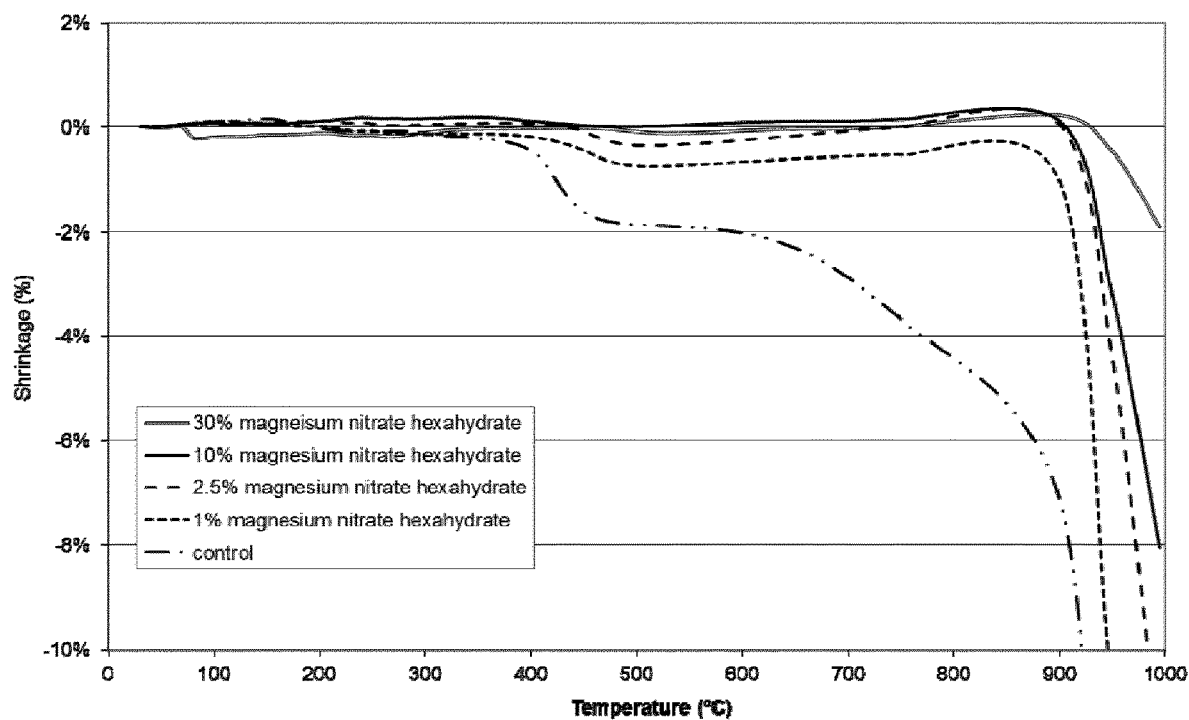

CALCIUM SULPHASE-BASED PRODUCTS

This invention relates to improved high temperature resistant calcium sulphate-based products and, in particular, to calcium sulphate-based products having reduced shrinkage at high temperatures.

BACKGROUND

Calcium sulphate-based products are widely used in the construction of buildings, for example, to form internal partitions (using wallboard, also known as dry wall, gypsum board or plaster board) and ceilings or to encase ducts (e.g. ventilation ducts) within buildings.

Calcium sulphate-based products such as wallboard are typically formed by drying an aqueous slurry of the hemihydrate of calcium sulphate ($CaSO_4 \cdot \frac{1}{2} H_2O$), also known as calcined gypsum or stucco, between two sheets of lining paper or fibreglass matting. As the slurry dries and the calcined gypsum is hydrated, a hard, rigid core of gypsum (calcium sulphate dihydrate—($CaSO_4 \cdot 2H_2O$)) sandwiched between the lining sheets/mats is formed.

When wallboard or ceiling tiles are exposed to high temperatures such as those experienced in a building fire or those experienced by wallboards used for encasing ducts carrying high temperature fluids, the water of crystallization contained within the gypsum is driven off to yield the anhydrite of calcium sulphate. Initially, this has the advantage that heat transfer across the wallboard/ceiling tile is reduced thus helping to contain the heat emanating from ducting or generated during a building fire. However, at temperatures around 400-450° C., the initially formed AIII phase anhydrite (also known as $\gamma$-$CaSO_4$ or "soluble" anhydrite) converts to the AII phase (or "insoluble" anhydrite) and this phase change results in shrinkage of the wallboard/tile i.e. a loss of dimensional stability. This shrinkage often causes the wallboards to pull away from their supporting structures. This is obviously undesirable. It can leave ducts exposed to high temperatures. Furthermore, in situations where wallboard is used for internal partitions and a fire breaks out, shrinkage can leaves gaps exposing rooms adjacent to the fire source to the effects of the heat/fire. Gaps also allow ingress of oxygen into the fire source thus fueling the fire and negating the effects of any fire doors.

At higher temperatures (in excess of 600° C.), the insoluble anhydrite goes on to sinter resulting in large reductions in wallboard volume. This results in extreme shrinkage which eventually causes collapse of the internal walls/ceilings/duct casings as they are no longer held by their supporting structures.

Efforts have been made to improve the heat resistance of calcium sulphate-based products such as wallboard in an attempt to reduce shrinkage.

It is known e.g. from EP0258064 to use micro silica as an additive in the gypsum core of wallboard to reduce shrinkage. However, this additive only has an effect at temperatures greater than 600° C. i.e. it does not resist the shrinkage of the board at lower temperatures and linear shrinkage of more than 10% is still seen as temperatures around 1000° C.

It is known from WO99/08979 and WO00/06518 to add sodium trimetaphosphate (STMP), sodium hexametaphosphate (SHMP) or ammonium polyphosphate (APP) to a calcium sulphate wallboard core to improve strength, sag resistance and shrinkage during drying. No effect of these additives on shrinkage during exposure to high temperatures is recorded.

U.S. Pat. No. 5,985,013 discloses an ablative type heat protecting material containing calcium sulphate hemihydrate and a hydrated salt. A number of hydrated salts are used including magnesium nitrate hexahydrate (used in an amount of 40 wt % based on the weight of dry ingredients). The time taken for heat transfer across the heat ablative material was recorded. No mention is made of any shrinkage resistance properties of the hydrated salts.

Calcium sulphate-based products are also used to cast metal or glass objects. Calcium sulphate moulds are heated to 700-900° C. prior to being filled with molten metal/glass. It is important to control high temperature shrinkage of such calcium sulphate-based moulds to ensure that the moulds do not leak and to ensure that the cast metal/glass products are not warped.

A preferred aim of the present invention is to provide an improved heat resistant calcium sulphate-based product having reduced shrinkage after heat exposure e.g. when in contact with ducting, during a building fire or during casting of metal products. Such an improved heat resistant product may have particular use as a building product e.g. wallboard or panels for forming internal partitions in buildings, ceiling tiles, wallboard or panels for encasing ventilation/smoke extraction ducting, joint filler materials for joining wallboard/panels/tiles or for moulds for use in metal/glass product casting.

SUMMARY OF THE INVENTION

Accordingly, in a first aspect, the present invention provides a calcium sulphate-based product comprising gypsum and a shrinkage resistance additive, wherein the shrinkage resistance additive is a metal nitrate, hydroxide, acetate or sulphate.

In a second aspect, the present invention provides a calcium sulphate-based product comprising gypsum and a shrinkage resistance additive, wherein the product is formed from drying an aqueous slurry containing calcined gypsum and said shrinkage resistance additive, the shrinkage resistance additive being a metal nitrate, hydroxide, acetate or sulphate.

In a third aspect, the present invention provides a method of forming a calcium sulphate-based product by drying an aqueous slurry comprising calcined gypsum and a shrinkage resistance additive wherein the shrinkage resistance additive is a metal nitrate, hydroxide, acetate or sulphate.

In a fourth aspect, the present invention provides the use of a metal nitrate, hydroxide, acetate or sulphate as an additive in a gypsum matrix for reducing shrinkage in a calcium sulphate-based product during heat exposure.

In a fifth aspect, the present invention provides a calcium sulphate-based composition for use in forming a calcium sulphate-based product by drying an aqueous slurry of the calcium sulphate-based composition, the calcium sulphate-based composition comprising calcined gypsum and a shrinkage resistance additive, wherein the shrinkage resistance additive is a metal nitrate, hydroxide, acetate or sulphate.

The inventors have found that including a metal nitrate, hydroxide, acetate or sulphate salt in a calcium sulphate based product e.g. the gypsum core of a wallboard reduces shrinkage of the wallboard when the board is exposed to high temperatures. Unlike micro silica which only has an effect above 600° C., the metal nitrate, hydroxide, acetate or sulphate begins to have an effect around 400° C. where it undergoes an endothermic decomposition (to yield oxides, oxygen and nitrogen oxides) and thus acts as a heat sink. The metal nitrate, hydroxide, acetate or sulphate also acts to increase the temperature at which the transition from the soluble to insoluble calcium sulphate anhydrite occurs thus allowing the product to resist the shrinkage arising from the phase change until higher temperatures (greater than 900° C.) are reached. The inventors have found that a metal-rich layer forms at the surface of the calcium sulphate based product and it is believed that this metal-rich layer protects the calcium sulphate anhydrite and delays the transition until higher temperatures.

Optional features of the invention will now be set out. These are applicable singly or in any combination with any aspect of the invention.

The metal in the metal salt may be an alkaline earth metal e.g. calcium or magnesium. The metal may be a transition metal e.g. copper, iron or zinc. The metal may be aluminium. The metal may be an alkali metal e.g. potassium.

Preferably the metal nitrate is magnesium nitrate, aluminium nitrate, zinc nitrate or iron nitrate. Magnesium nitrate is hygroscopic and typically exists as magnesium nitrate hexahydrate, $Mg(NO_3)_2.6H_2O$. Aluminium nitrate is also hygroscopic and typically exists as aluminium nitrate nonahydrate, $Al(NO_3)_3.9H_2O$. Zinc nitrate is hygroscopic and typically exists as zinc nitrate hexahydrate, $Zn(NO_3)_2.6H_2O$ or zinc nitrate tetrahydrate $Zn(NO_3)_2.4H_2O$. Iron nitrate is also hygroscopic and typically exists as iron nitrate nonahydrate, $Fe(NO_3)_3.9H_2O$.

The metal hydroxide, acetate or sulphate may be magnesium hydroxide, acetate or sulphate aluminium hydroxide, acetate or sulphate, zinc hydroxide, acetate or sulphate or iron hydroxide or acetate. Preferably, it is magnesium hydroxide $(Mg(OH)_2)$, acetate or sulphate. Magnesium acetate is hygroscopic and typically exists as magnesium acetate tetrahydrate, $Mg(C_2H_3O_2)_2.4H_2O$. Magnesium sulphate is hygroscopic and typically exists as magnesium sulphate heptahydrate, $MgSO_4.7H_2O$.

The calcium sulphate-based product is formed from drying an aqueous slurry containing calcined gypsum (or stucco) and the metal nitrate, hydroxide, acetate or sulphate anti-shrinkage additive.

In some embodiments, the metal nitrate, hydroxide, acetate or sulphate is present in the slurry and in the calcium sulphate-based composition in an amount greater than or equal to 1 wt % or greater than or equal to 2 wt % or greater than or equal to 4.5 wt % or greater than or equal to 9 wt % or greater or equal to than 15 wt % or greater than or equal to 20 wt % or greater than or equal to 25 wt % (based on the amount of nitrate, hydroxide, acetate or sulphate/calcined gypsum in the slurry/composition).

In some embodiments, the metal nitrate, hydroxide, acetate or sulphate is present in the slurry and in the calcium sulphate-based composition in an amount equal to or less than 50 wt % or equal to or less than 40 wt % or equal to or less than 30 wt % (based on the amount of nitrate, hydroxide, acetate or sulphate/calcined gypsum in the slurry/composition).

In preferred embodiments, the metal nitrate, hydroxide, acetate or sulphate is present in the slurry/composition in an amount between 4.5 wt % and less than 30 wt %.

In some embodiments, the metal nitrate, hydroxide, acetate or sulphate is present in the resulting calcium sulphate-based product in an amount greater than or equal to 0.5 wt % or greater than or equal to 2 wt % or greater than or equal to 4 wt % or greater than or equal to 7 wt % or greater or equal to than 12 wt % or greater than or equal to 15 wt % or greater than or equal to 20 wt % (based on the amount of nitrate, hydroxide, acetate or sulphate/gypsum in the product).

In some embodiments, the metal nitrate, hydroxide, acetate or sulphate is present in the calcium sulphate-based product in an amount equal to or less than 40 wt % or equal to or less than 35 wt % or equal to or less than 25 wt % (based on the amount of nitrate, hydroxide, acetate or sulphate/gypsum in the product).

In preferred embodiments, the metal nitrate, hydroxide, acetate of sulphate is present in the calcium sulphate-based product in an amount between 4 wt % and less than 25 wt %.

The term calcined gypsum (or stucco) is intended to refer predominantly to calcium sulphate hemihydrate ($CaSO_4.\frac{1}{2}H_2O$) but may also encompass any other calcium sulphate compound having a lower bound water content than calcium sulphate dihydrate (e.g. calcium sulphate anhydrite).

The term "gypsum" is intended to refer predominantly to calcium sulphate dihydrate ($CaSO_4.2H_2O$).

In some embodiments, the calcined gypsum is present in the slurry and in the calcium-sulphate-based composition in an amount of 99-50 wt % (based on the amount of nitrate, hydroxide, acetate or sulphate/calcined gypsum in the slurry/composition). More preferably, it is present in an amount from 98 to 70 wt % or 90 to 70 wt %.

In some embodiments, the gypsum is present in the calcium sulphate-based product an amount of 99.5-60 wt % (based on the amount of nitrate, hydroxide, acetate or sulphate/gypsum in the product). More preferably, it is present in an amount from 98 to 75 wt % or 95 to 75 wt %.

Preferably, the product e.g. the gypsum core of the product contains no clinker i.e. no product produced by sintering limestone and alumina-silicate.

The term "calcium sulphate-based product" may include building products such as wallboards (with or without liners) (with or without fibrous reinforcement), tiles (e.g. ceiling tiles), duct encasement panels, joint filler materials (e.g. for joining adjacent wallboards/tiles/panels etc.), plaster compositions and moulds for casting metal products.

The term "calcium sulphate-based" will be readily understood as meaning that the product comprises gypsum as a major component i.e. that gypsum is the largest single component in terms of wt % of the product. The term may mean that the product comprises gypsum in 40 wt %, 50 wt %, 60 wt %, 70 wt %, 80 wt %, 90 wt % or greater based on the total weight of the product.

The calcium sulphate-based product may be a composite product e.g. it may be a wallboard having a gypsum matrix core (containing the shrinkage resistance additive) sandwiched between two liners (e.g. paper liners or fibreglass matting).

In some embodiments, the calcium sulphate-based product contains substantially no inorganic fibres e.g. no glass or asbestos fibres. The present inventors have found that the addition of a combination of a clay additive and a metal salt can help maintain strength and structural integrity after heating even in the absence of a fibrous network.

However, in some embodiments, the calcium sulphate-based product may contain inorganic fibres (e.g. glass fibres) and/or matting (e.g. glass matting) as this may help improve strength of the product prior to heating.

The calcium sulphate-based product may contain additives such as accelerators, retarders, foaming/anti-foaming agents, fluidisers etc. The accelerators may be, for example, freshly ground gypsum having an additive of sugar or surfactant. Such accelerators may include Ground Mineral NANSA (GMN), heat resistant accelerator (HRA) and ball milled accelerator (BMA). Alternatively, the accelerator may be a chemical additive such as aluminium sulphate, zinc sulphate or potassium sulphate. In certain cases, a mixture of accelerators may be used, e.g. GMN in combination with a sulphate accelerator. As a further alternative, ultrasound may be used to accelerate the setting rate of the slurry, e.g. as described in US2010/0136259.

DESCRIPTION OF THE DRAWING

FIG. 1 shows a graph of linear shrinkage for a control sample and inventive samples during heating to 1000° C.

EXPERIMENTAL

The following examples are given by way of illustration only.

Control Sample 1

200 g of calcined gypsum was added to 140 g of water at 40° C. This was mixed by hand for 30 seconds and the resulting slurry was poured into a cylindrical silicone mould (of height 25 mm and diameter 12 mm). The sample was transferred to an oven at 40° C. and left to dry overnight (at least 12 hours).

Sample 1—Magnesium Nitrate—1% wt:wt Calcined Gypsum 2 g of magnesium nitrate hexahydrate was added to 140 g of water at 40° C. 200 g of calcined gypsum was added to the solution and the resulting slurry (containing 1.0 wt % nitrate based on weight of calcined gypsum) was blended by hand for 30 seconds to form a slurry. The resulting slurry was poured into a cylindrical silicone mould (of height 25 mm and diameter 12 mm) and the sample was transferred to an oven at 40° C. and left to dry overnight (at least 12 hours).

Sample 2—Magnesium Nitrate—2.5% wt:wt Calcined Gypsum 5 g of magnesium nitrate hexahydrate was added to 140 g of water at 40° C. 200 g of calcined gypsum was added to the solution and the resulting slurry (containing 2.4 wt % nitrate based on weight of dry ingredients/containing 2.5 wt % based on weight of calcined gypsum) was blended by hand for 30 seconds to form a slurry. The resulting slurry was poured into a cylindrical silicone mould (of height 25 mm and diameter 12 mm) and the sample was transferred to an oven at 40° C. and left to dry overnight (at least 12 hours).

Sample 3—Magnesium Nitrate—5% wt:wt Calcined Gypsum 10 g of magnesium nitrate hexahydrate was added to 140 g of water at 40° C. 200 g of calcined gypsum was added to the solution and the resulting slurry (containing 4.8 wt % nitrate based on weight of dry ingredients/containing 5 wt % based on weight of gypsum) was blended by hand for 30 seconds to form a slurry. The resulting slurry was poured into a cylindrical silicone mould (of height 25 mm and diameter 12 mm) and the sample was transferred to an oven at 40° C. and left to dry overnight (at least 12 hours).

Sample 4—Magnesium Nitrate—10% wt:wt Calcined Gypsum 20 g of magnesium nitrate hexahydrate was added to 140 g of water at 40° C. 200 g of calcined gypsum was added to the solution and the resulting slurry (containing 9.1 wt % nitrate based on weight of dry ingredients/containing 10 wt % based on weight of gypsum) was blended by hand for 30 seconds to form a slurry. The resulting slurry was poured into a cylindrical silicone mould (of height 25 mm and diameter 12 mm) and the sample was transferred to an oven at 40° C. and left to dry overnight (at least 12 hours).

Sample 5—Magnesium Nitrate—30% wt:wt Calcined Gypsum 60 g of magnesium nitrate hexahydrate was added to 140 g of water at 40° C. 200 g of calcined gypsum was added to the solution and the resulting slurry (containing 23.1 wt % nitrate based on weight of dry ingredients/containing 30 wt % based on weight of gypsum) was blended by hand for 30 seconds to form a slurry. The resulting slurry was poured into a cylindrical silicone mould (of height 25 mm and diameter 12 mm) and the sample was transferred to an oven at 40° C. and left to dry overnight (at least 12 hours).

Sample 6—Aluminium Nitrate—2.5% wt:wt Calcined Gypsum 5 g of aluminium nitrate nonahydrate was added to 140 g of water at 40° C. 200 g of calcined gypsum was added to the solution and the resulting slurry (containing 2.4 wt % nitrate based on weight of dry ingredients/containing 2.5 wt % based on weight of calcined gypsum) was blended by hand for 30 seconds to form a slurry. The resulting slurry was poured into a cylindrical silicone mould (of height 25 mm and diameter 12 mm) and the sample was transferred to an oven at 40° C. and left to dry overnight (at least 12 hours).

Sample 7—Aluminium Nitrate—5% wt:wt Calcined Gypsum 10 g of aluminium nitrate nonahydrate was added to 140 g of water at 40° C. 200 g of calcined gypsum was added to the solution and the resulting slurry (containing 4.8 wt % nitrate based on weight of dry ingredients/containing 5 wt % based on weight of gypsum) was blended by hand for 30 seconds to form a slurry. The resulting slurry was poured into a cylindrical silicone mould (of height 25 mm and diameter 12 mm) and the sample was transferred to an oven at 40° C. and left to dry overnight (at least 12 hours).

Sample 8—Aluminium Nitrate—10% wt:wt Calcined Gypsum 20 g of aluminium nitrate nonahydrate was added to 140 g of water at 40° C. 200 g of calcined gypsum was added to the solution and the resulting slurry (containing 9.1 wt % nitrate based on weight of dry ingredients/containing 10 wt % based on weight of gypsum) was blended by hand for 30 seconds to form a slurry. The resulting slurry was poured into a cylindrical silicone mould (of height 25 mm and diameter 12 mm) and the sample was transferred to an oven at 40° C. and left to dry overnight (at least 12 hours).

Sample 9—Zinc Nitrate—2.5% wt:wt Calcined Gypsum 5 g of zinc nitrate hexahydrate was added to 140 g of water at 40° C. 200 g of calcined gypsum was added to the solution and the resulting slurry (containing 2.4 wt % nitrate based on weight of dry ingredients/containing 2.5 wt % based on weight of calcined gypsum) was blended by hand for 30 seconds to form a slurry. The resulting slurry was poured into a cylindrical silicone mould (of height 25 mm and diameter 12 mm) and the sample was transferred to an oven at 40° C. and left to dry overnight (at least 12 hours).

Sample 10—Zinc Nitrate—5% wt:wt Calcined Gypsum 10 g of zinc nitrate hexahydrate was added to 140 g of water at 40° C. 200 g of calcined gypsum was added to the solution and the resulting slurry (containing 4.8 wt % nitrate based on weight of dry ingredients/containing 5 wt % based on weight of gypsum) was blended by hand for 30 seconds to form a slurry. The resulting slurry was poured into a cylindrical silicone mould (of height 25 mm and diameter 12 mm) and the sample was transferred to an oven at 40° C. and left to dry overnight (at least 12 hours).

Sample 11—Zinc Nitrate—10% wt:wt Calcined Gypsum 20 g of zinc nitrate hexahydrate was added to 140 g of water at 40° C. 200 g of calcined gypsum was added to the solution and the resulting slurry (containing 9.1 wt % nitrate based on weight of dry ingredients/containing 10 wt % based on weight of gypsum) was blended by hand for 30 seconds to form a slurry. The resulting slurry was poured into a cylindrical silicone mould (of height 25 mm and diameter 12 mm) and the sample was transferred to an oven at 40° C. and left to dry overnight (at least 12 hours).

Sample 12—Iron Nitrate—2.5% wt:wt Calcined Gypsum 5 g of iron (III) nitrate nonahydrate was added to 140 g of water at 40° C. 200 g of calcined gypsum was added to the solution and the resulting slurry (containing 2.4 wt % nitrate based on weight of dry ingredients/containing 2.5 wt % based on weight of calcined gypsum) was blended by hand for 30 seconds to form a slurry. The resulting slurry was poured into a cylindrical silicone mould (of height 25 mm and diameter 12 mm) and the sample was transferred to an oven at 40° C. and left to dry overnight (at least 12 hours).

Sample 13—Iron Nitrate—5% wt:wt Calcined Gypsum 10 g of iron (III) nitrate nonahydrate was added to 140 g of water at 40° C. 200 g of calcined gypsum was added to the solution and the resulting slurry (containing 4.8 wt % nitrate based on weight of dry ingredients/containing 5 wt % based on weight of gypsum) was blended by hand for 30 seconds to form a slurry. The resulting slurry was poured into a cylindrical silicone mould (of height 25 mm and diameter 12 mm) and the sample was transferred to an oven at 40° C. and left to dry overnight (at least 12 hours).

Sample 14—Iron Nitrate—10% wt:wt Calcined Gypsum 20 g of iron (III) nitrate nonahydrate was added to 140 g of water at 40° C. 200 g of calcined gypsum was added to the solution and the resulting slurry (containing 9.1 wt % nitrate based on weight of dry ingredients/containing 10 wt % based on weight of gypsum) was blended by hand for 30 seconds to form a slurry. The resulting slurry was poured into a cylindrical silicone mould (of height 25 mm and diameter 12 mm) and the sample was transferred to an oven at 40° C. and left to dry overnight (at least 12 hours).

Sample 15—Potassium Nitrate—10% wt:wt Calcined Gypsum 20 g of potassium nitrate was added to 140 g of water at 40° C. 200 g of calcined gypsum was added to the solution and the resulting slurry (containing 9.1 wt % nitrate based on weight of dry ingredients/containing 10 wt % based on weight of gypsum) was blended by hand for 30 seconds to form a slurry. The resulting slurry was poured into a cylindrical silicone mould (of height 25 mm and diameter 12 mm) and the sample was transferred to an oven at 40° C. and left to dry overnight (at least 12 hours).

Sample 16—Copper Nitrate—8% wt:wt Calcined Gypsum 16 g of copper nitrate tetrahydrate was added to 140 g of water at 40° C. 200 g of calcined gypsum was added to the solution and the resulting slurry (containing 7.4 wt % nitrate based on weight of dry ingredients/containing 5 wt % based on weight of gypsum) was blended by hand for 30 seconds to form a slurry. The resulting slurry was poured into a cylindrical silicone mould (of height 25 mm and diameter 12 mm) and the sample was transferred to an oven at 40° C. and left to dry overnight (at least 12 hours).

Sample 17—Calcium Nitrate—9% wt:wt Calcined Gypsum 18 g of calcium nitrate tetrahydrate was added to 140 g of water at 40° C. 200 g of calcined gypsum was added to the solution and the resulting slurry (containing 8.3 wt % nitrate based on weight of dry ingredients/containing 9 wt % based on weight of gypsum) was blended by hand for 30 seconds to form a slurry. The resulting slurry was poured into a cylindrical silicone mould (of height 25 mm and diameter 12 mm) and the sample was transferred to an oven at 40° C. and left to dry overnight (at least 12 hours).

Sample 18—Magnesium Hydroxide—10% wt:wt Calcined Gypsum 20 g of magnesium hydroxide was added to 140 g of water at 40° C. 200 g of calcined gypsum was added to the solution and the resulting slurry (containing 9.1 wt % hydroxide based on weight of dry ingredients/containing 7.8 wt % based on weight of gypsum) was blended by hand for 30 seconds to form a slurry. The resulting slurry was poured into a cylindrical silicone mould (of height 25 mm and diameter 12 mm) and the sample was transferred to an oven at 40° C. and left to dry overnight (at least 12 hours).

Sample 19—Magnesium Acetate—10% wt:wt Calcined Gypsum 20 g of magnesium acetate tetrahydrate was added to 140 g of water at 40° C. 200 g of calcined gypsum was added to the solution and the resulting slurry (containing 9.1 wt % acetate based on weight of dry ingredients/containing 7.8 wt % based on weight of gypsum) was blended by hand for 30 seconds to form a slurry. The resulting slurry was poured into a cylindrical silicone mould (of height 25 mm and diameter 12 mm) and the sample was transferred to an oven at 40° C. and left to dry overnight (at least 12 hours).

Sample 20—Magnesium Sulphate—10% wt:wt Calcined Gypsum 20 g of magnesium sulphate heptahydrate was added to 140 g of water at 40° C. 200 g of calcined gypsum was added to the solution and the resulting slurry (containing 9.1 wt % sulphate based on weight of dry ingredients/containing 7.8 wt % based on weight of gypsum) was blended by hand for 30 seconds to form a slurry. The resulting slurry was poured into a cylindrical silicone mould (of height 25 mm and diameter 12 mm) and the sample was transferred to an oven at 40° C. and left to dry overnight (at least 12 hours).

A summary of all sample formulations is shown in Table 1 below.

| Nitrate | | % wt:wt stucco | Wt % in slurry | Wt % in product |
| --- | --- | --- | --- | --- |
| Mg | 1 | 1 | 1.0 | 0.8 |
| | 2 | 2.5 | 2.4 | 2.0 |
| | 3 | 5 | 4.8 | 4.0 |
| | 4 | 10 | 9.1 | 7.8 |
| | 5 | 30 | 23.1 | 20.2 |
| Al | 6 | 2.5 | 2.4 | 2.0 |
| | 7 | 5 | 4.8 | 4.1 |
| | 8 | 10 | 9.1 | 7.8 |
| Zn | 9 | 2.5 | 2.4 | 2.0 |
| | 10 | 5 | 4.8 | 4.1 |
| | 11 | 10 | 9.1 | 7.8 |
| Fe | 12 | 2.5 | 2.4 | 2.0 |
| | 13 | 5 | 4.8 | 4.0 |
| | 14 | 10 | 9.1 | 7.8 |
| K | 15 | 10 | 9.1 | 7.8 |
| Cu | 16 | 8 | 7.4 | 6.3 |
| Ca | 17 | 9 | 8.3 | 7.1 |
| $Mg(OH)_2$ | 18 | 10 | 9.1 | 7.8 |
| $Mg(C_2H_3O_2)_2$ | 19 | 10 | 9.1 | 7.8 |
| $MgSO_4$ | 20 | 10 | 9.1 | 7.8 |

Linear Shrinkage

The linear shrinkage of the samples was measured using a Netzsch dilatometer with a ceramic rod attached to a linear displacement transducer having a resolution of 8 nm. The samples were supported by other ceramic rods and the heated in a furnace to 1000° C. at a rate of 5° C./min. The results are shown in FIGS. 1 and 2 and Table 2 below.

| Formulation | | 500° C. | 750° C. | 900° C. | 950° C. | 1000° C. |
|---|---|---|---|---|---|---|
| Control | | −1.8 | −3.6 | −7.1 | −18.0 | Off scale |
| Mg nitrate | 1 | −0.8 | −0.7 | −1.3 | −10.6 | −12.3 |
| | 2 | −0.3 | −0.1 | 0.0 | −4.4 | −12.1 |
| | 3 | −0.3 | −0.3 | −0.5 | −7.0 | −12.1 |
| | 4 | −0.0 | −0.1 | 0.2 | −2.8 | −6.5 |
| | 5 | −0.5 | 0.1 | 0.2 | −0.5 | −1.9 |
| Al nitrate | 6 | −0.7 | −2.0 | −5.6 | −11.7 | −16.7 |
| | 7 | −0.8 | −1.4 | −5.3 | −10.4 | −15.7 |
| | 8 | −0.7 | −0.4 | −0.4 | −0.9 | −3.5 |
| Zn nitrate | 9 | −0.9 | −1.1 | −7.4 | −17.8 | Off-scale |
| | 10 | −0.4 | −0.8 | −7.6 | −17.3 | Off-scale |
| | 11 | −0.2 | −0.3 | −1.8 | −6.5 | −9.7 |
| Fe nitrate | 12 | −0.9 | −1.6 | −4.7 | −15.9 | −17.0 |
| | 13 | −0.3 | −0.7 | −2.9 | −9.0 | −15.9 |
| | 14 | −0.6 | −0.7 | −3.6 | −7.7 | −12.3 |
| K nitrate | 15 | −0.9 | −2.8 | −16.4 | −17.4 | Off-scale |
| Cu nitrate | 16 | −0.2 | −1.5 | −12.9 | Off-scale | Off-scale |
| Ca nitrate | 17 | −0.3 | −2.8 | −9.1 | −9.1 | Off-scale |
| Mg hydroxide | 18 | −1.4 | −3.2 | −5.8 | −8.0 | −9.9 |
| Mg acetate | 19 | −0.7 | −3.5 | −5.3 | −9.7 | −12.7 |
| Mg sulphate | 20 | −1.4 | −3.2 | −5.1 | −7.4 | −11.1 |

It can be seen that:
a) linear shrinkage is reduced at 500° C. and 750° C. for all samples;
b) linear shrinkage is reduced at all temperatures for all magnesium and aluminium salt samples;
c) linear shrinkage at 900° C. is reduced to less than around 1% for all samples containing magnesium nitrate; and
d) linear shrinkage reduction is greater at addition levels greater than 4 wt % (based on amount of additive/gypsum in product) and especially at addition levels greater than 7 wt %.

The invention claimed is:
1. A calcium sulphate-based product comprising:
gypsum, and
a shrinkage resistance additive provided in an amount between 4 wt % and 40 wt % based on a weight of the gypsum and the shrinkage resistance additive, wherein the shrinkage resistance additive is an acetate of magnesium, an acetate of zinc, or an acetate of iron.
2. The product according to claim 1, wherein the product is a building material or a mould for metal casting.
3. The product according to claim 1, wherein the product is a composite wallboard comprising a core of the gypsum and shrinkage resistance additive sandwiched between two liners.
4. A calcium sulphate-based product prepared by a process comprising the steps of:
providing calcined gypsum,
providing a shrinkage resistance additive in an amount between 4.5 wt % and 50 wt % based on a weight of the gypsum and the shrinkage resistance additive, and
drying an aqueous slurry comprising the calcined gypsum and the shrinkage resistance additive, wherein
the shrinkage resistance additive is an acetate of magnesium, an acetate of zinc, or an acetate of iron.
5. A calcium sulphate-based composition for use in forming a calcium sulphate-based product by drying an aqueous slurry of the calcium sulphate-based composition, the calcium sulphate-based composition comprising:
calcined gypsum, and
between 4.5 wt % and 50 wt % of a shrinkage resistance additive based on an amount of the gypsum and the shrinkage resistance additive, wherein
the shrinkage resistance additive is an acetate of magnesium, an acetate of zinc, or an acetate of iron.
6. A method of forming a calcium sulphate-based product by drying an aqueous slurry comprising a composition according to claim 5.
7. The method according to claim 6, wherein the product is a building material or a mould for casting metal.
8. The method according to claim 7, wherein the product is a composite wallboard and the method comprises drying the aqueous slurry between two liners.

* * * * *